Nov. 26, 1968     B. LEMANSKI     3,412,810
AGITATING MECHANISM FOR BEAM HARVESTERS
Filed Oct. 7, 1965     2 Sheets-Sheet 1
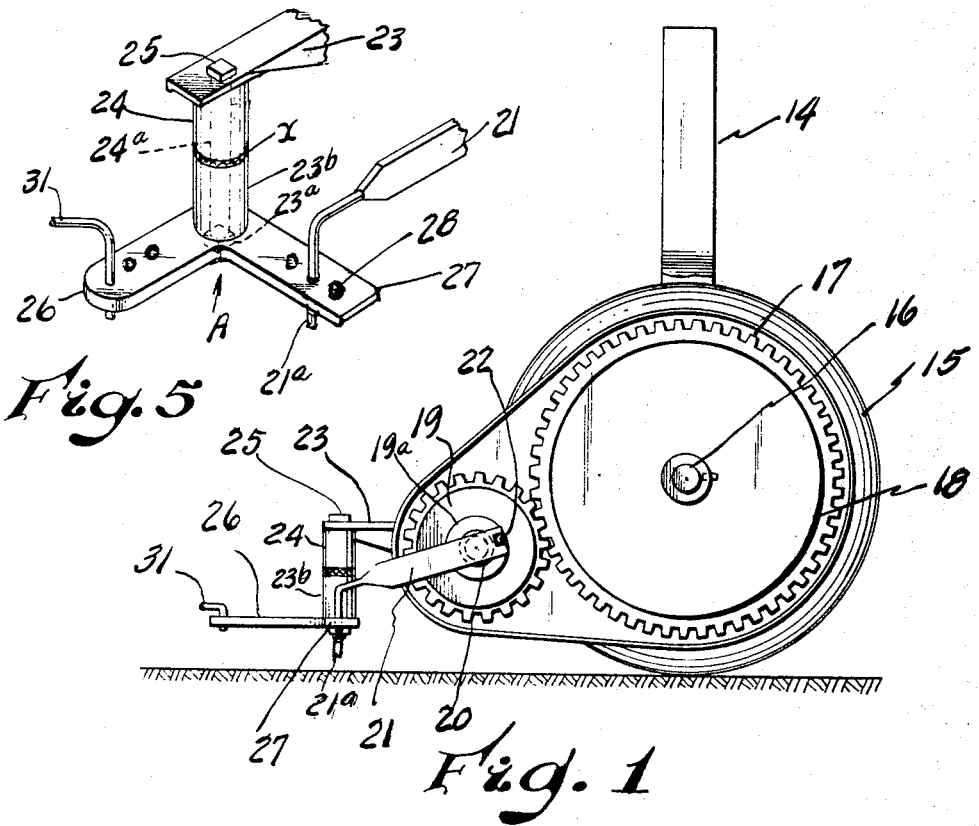
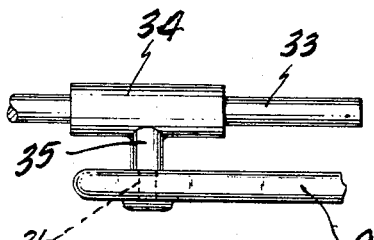
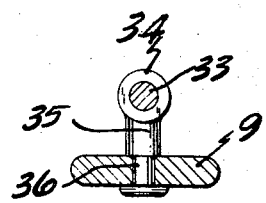
INVENTOR.
Bernard Lemanski
BY
Fearman Fearman &
McCulloch
ATTORNEYS Nov. 26, 1968  B. LEMANSKI  3,412,810
AGITATING MECHANISM FOR BEAM HARVESTERS
Filed Oct. 7, 1965  2 Sheets-Sheet 2

INVENTOR.
Bernard Lemanski
BY Learman Learman & McCulloch
ATTORNEYS

United States Patent Office 3,412,810
Patented Nov. 26, 1968

3,412,810
AGITATING MECHANISM FOR
BEAN HARVESTERS
Bernard Lemanski, 308 Silver St.,
Bad Axe, Mich. 48413
Filed Oct. 7, 1965, Ser. No. 493,681
6 Claims. (Cl. 171—83)

ABSTRACT OF THE DISCLOSURE

The present invention relates to agitating and actuating mechanism for bean harvesters, and more particularly to a mechanism which agitates and loosens the plants to shake the dirt and foreign matter from the roots.

---

This invention relates to an agitating mechanism connected with a bean harvester or similar machine for agitating the severed stalks and forcing any roots remaining in the ground, out of the ground into a continuous row so that they quickly dry, after which they can be placed in piles or conveyed to a suitable building where the threshing operation is performed.

One of the prime objects of the invention is to design a simple, practical and inexpensive agitating mechanism for agitating the stalks after the pulling operation to raise the root sections, etc. clear of the ground, so that the entire beanstalk lies completely on the surface of the ground, and is subjected to air and sunshine for curing purposes.

Still a further object is to design a toothed agitating mechanism, associated with the blade shoes of the bean harvester for engaging the stalks when harvested or cut, to agitate said stalks and winnow two or more into a continuous single row.

A further object still is to provide a very simple, practical, and easily operable agitating mechanism engageable with the severed stalks for removal of the dirt or other foreign matter from the stalks and bean pods and guiding them into one continuous row.

With the above and other objects in view, the present invention consists in the combination and arrangement of parts, hereinafter more full described, illustrated in the accompanying drawings, and more particularly pointed out in the appended claims; it being understood that changes may be made in the form, size, proportion and minor details of construction, without departing from the spirit, or sacrificing any of the advantages of the invention.

In the drawing:

FIG. 1 is a fragmentary, side elevational view of my harvester with the agitating mechanism in position thereon.

FIG. 3 is a fragmentary, side elevational view of the angularly shaped bearing.

FIG. 4 is a sectional end elevational view showing the pivotally mounted bracket.

FIG. 5 is a perspective plan view of the arm brackets.

Figure 2:
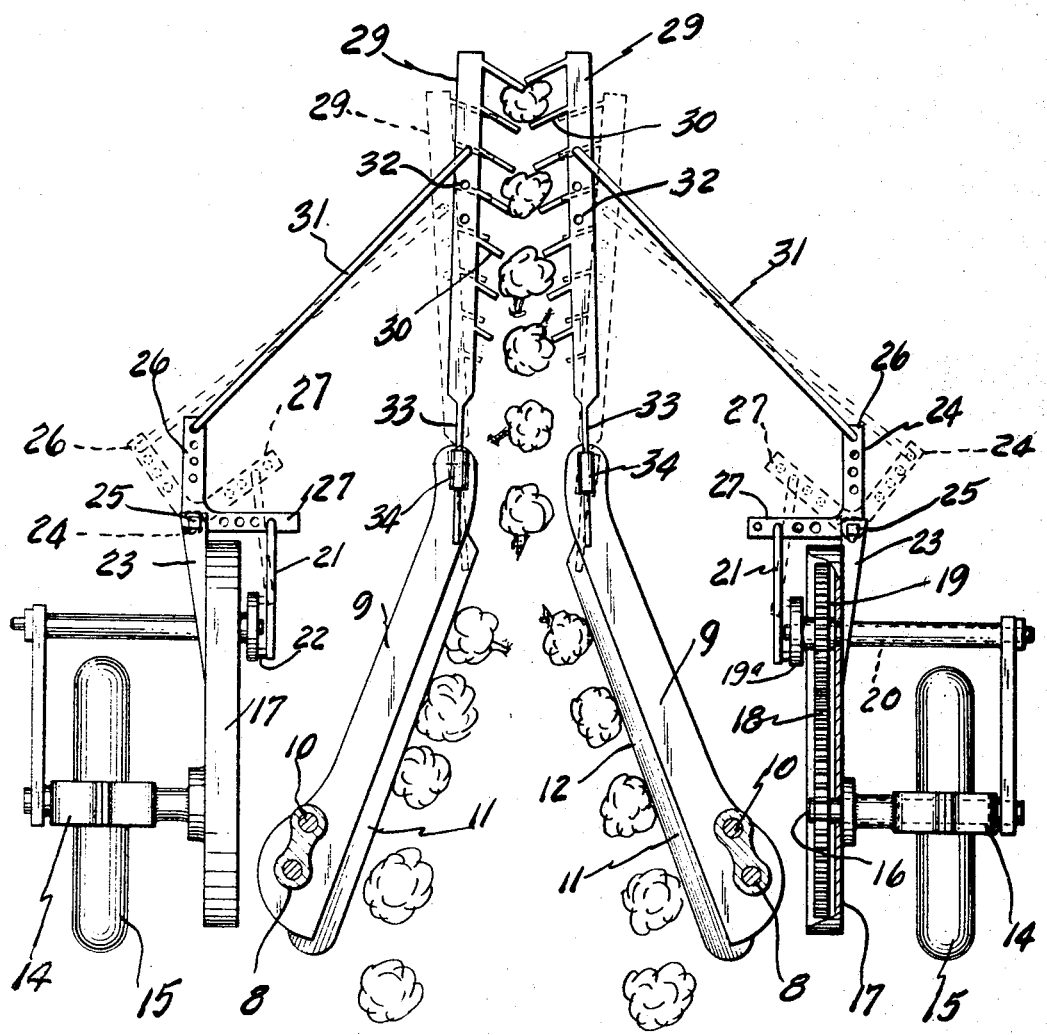
FIG. 2 is a top plan view of the mechanism, one of the gear housings being shown in section, the broken lines indicating the swing movement of the pronged bars.

Referring now more particularly to the drawings in which I have shown one embodiment of my invention.

The agitating mechanism herein referred to is mounted on a bean harvester frame (not shown) and includes spaced apart standards 8 to which a pair of elongated shoes 9 are attached by means of bolts 10 or the like. A pair of relatively thin blade members 11 are detachably mounted on the shoes 9, the exposed edges of which are sharpened to form a cutting edge 12, said shoes being disposed at a predetermined angle with relation to the surface of the ground in which they operate and project slightly below the surface of the ground for shearing the stalks of the plants during the harvesting operation. The bean harvester normally handles two rows of bean plants, all as shown and described in my Bean Puller, Patent No. 3,190,361, granted June 22, 1965.

The main frame of the harvester is provided with frame legs 14 as shown, and pneumatic wheels 15 are mounted on horizontally disposed wheel axles 16 provided in said legs, and a gear housing 17 forms a part of the combination, which is provided on the inner face of the legs, one end of said axle extending into said gear housing, and a drive gear 18 is mounted thereon, said gear meshing with and driving a smaller gear 19 mounted on a stub shaft 20 which is journaled in said housing. A disc 19a is also mounted on the shaft 20, and one end of a pitman 21 is journaled in a pin 22, mounted off-center on the disc 19a for furnishing reciprocating movement as the harvester is actuated.

A rearwardly extending arm 23 is mounted on the outer face of each gear housing, and includes a depending tubular section 24 which is bored as at 24a to accommodate a bolt 25, said bolt extending through a grease ring X interposed between the end of the tubular member 24 and the triangular-shaped leg bracket A, said bolt projecting through said bracket and having a nut 23a thereon for securing the assembly in position, and a grease bar X is provided between the tubular section 24 and the sleeve 23b for lubrication purposes. The leg bracket A comprises angularly disposed legs 26 and 27, respectively, the leg 26 extending rearwardly as shown, while the leg 27 projects transversely at an angle of approximately ninety degrees with relation thereto, and the outer end of the pitman 21 terminating in a reduced cylindrical section 21a which is slidably mounted in one of the openings 28 provided in the leg 27, said openings being slightly elongated to prevent binding when the mechanism is in operation, any number of spaced openings 28 being provided in said leg for adjustment as desired.

Each agitator assembly comprises a flat bar member 29 having a plurality of spaced apart prongs 30 of varying length, formed integral therewith, and an adjustable rod 31 is pivotally connected to the leg 26 and to the bar 29 with additional openings 32 in the bar to permit adjustment as desired. One end of the bar 29 is formed with a cylindrical shaft section 33 slidably mounted in a pivotally mounted bearing 34, see FIGS. 3 and 4 of the drawings, provided on the shoe 9, said bearing being formed with a cylindrical depending section 35 with a turned section 36 which is journaled in the end section of the shoe 9 to permit said bar and bearing to swing through a predetermined arc of travel as the harvester is operated. The stroke of the bars 29 is determined by the throw of the pitman 21 and the point of connection of the pitman to the leg 27, actuation of the leg 27 swinging the other leg 26 as indicated in broken lines in FIG. 2 of the drawings.

In practice, the harvester is usually powered by a farm tractor (not shown), the bean stalks being pulled or severed by the blades 11 as the harvester is operated, all as shown and described in the above identified Patent No. 3,190,361. As the harvester is operated, the wheels 15 actuate the gears 18 and 19, and the pitman 21 in turn actuates the bracket legs 26 and 27, the turned end section 33 of bar 29 sliding in the bearing 34 which, of course, reciprocates and swings the bars 29 accordingly, the prongs 30 engaging the bean stalks cut or severed by the knives 11. This drive furnishes the reciprocating movement of the bars 29 to agitate the stalks and loosen any clinging dirt or other foreign matter, the stalks then rest on the surface of the ground and can be stacked or hauled to a building or other location.

From the foregoing description, it will be obvious that I have perfected a very simple, practical, economical, labor saving agitating mechanism by means of which bean stalks can be readily pulled and then agitated to further pull the stalks if necessary and also insure the entire plant resting on the surface of the ground.

What I claim is:

1. An agitating mechanism for attachment to a mobile bean harvester comprising: a frame provided with ground engaging wheels including axles; a gear housing on said frame; drive gears mounted in said housing and driven by said axle; a bracket pivotally mounted on said frame, and having horizontally projecting legs; a pronged agitator bar connected to one of said bracket legs; bar prongs formed of progressively greater length; a rod pivotally connecting one of said bracket legs to said bar; and a pitman connected to said drive gear and to the opposite bracket leg for actuating said pronged bar as the harvester is operated.

2. The combination set forth in claim 1 in which a slide bearing is pivotally connected to the shoe and the agitator bar is formed with a turned shank for slidable accommodation in said shoe; bar prongs formed of progressively greater lengths; and a rod pivotally connecting one of said bracket legs to said bar.

3. The combination set forth in claim 1 which comprises a mobile super structure, including a drive axle; laterally spaced pronged agitator assemblies having a plurality of prongs; a gear housing; drive gears mounted therein and driven from said axles; a bracket pivotally mounted on said frame and connected to said agitating mechanism and drive gears, respectively; and means slidably accommodating said agitator bar to permit swinging and reciprocal movement of said agitator as the harvester is operating.

4. A bean harvester for attachment to a mobile super structure, including shoes and cutting blades; a frame including a gear housing; an axle; gears in said housing and drivingly connected to said axle; a bracket mounted on said frame and including transverse and longitudinally disposed legs; a bearing pivotally mounted on said shoe and including transverse and longitudinally disposed legs; and an agitating bar formed with a turned shank for slidable accommodation in said shoe.

5. Harvesting means for beans and like plants comprising: frame means; plant cutting means comprising a pair of cutter blades arranged in front to rear converging relation with the front ends spaced apart a greater distance than the rear ends; rearwardly extending agitators extending generally parallel from said blades; means for mounting said agitators on said blades for front to rear oscillatory movement with respect thereto; wheel means for said frame means and on which said frame means is supported; and means driven by said wheel means for imparting said oscillatory movement to said agitators.

6. Harvesting means for beans and like plants comprising: frame means; plant cutting means comprising a pair of spaced apart cutters in front to rear convergent relation; agitator members extending rearwardly from said cutters mounted for oscillatory movement in their generally horizontal planes; and means connected to said agitator members for imparting said oscillatory movement thereto.

References Cited

UNITED STATES PATENTS

| | | | |
|---|---|---|---|
| 206,568 | 7/1878 | Higgins | 171—106 X |
| 1,427,145 | 8/1922 | Yantz | 171—75 |
| 1,759,741 | 5/1930 | Fowler | 171—78 |
| 2,614,376 | 10/1952 | Madsen | 56—229 |
| 3,190,361 | 6/1965 | Lemanski | 171—83 |

ANTONIO F. GUIDA, *Primary Examiner.*